United States Patent [19]

Grill et al.

[11] 4,255,399

[45] Mar. 10, 1981

[54] PROCESS FOR THE RECOVERY OF MAGNESIUM OXIDE OF HIGH PURITY

[75] Inventors: Michael Grill, Leoben; Helmut Grohmann, St. Jakob bei Mixnitz, both of Austria

[73] Assignee: Veitscher Magnesitwerke-Actien-Gesellschaft, Vienna, Austria

[21] Appl. No.: 37,065

[22] Filed: May 8, 1979

[30] Foreign Application Priority Data

May 8, 1978 [AT] Austria ................................ 3328/78

[51] Int. Cl.$^3$ .............................................. C01F 5/10
[52] U.S. Cl. .................................... 423/164; 423/166; 423/497; 423/639
[58] Field of Search ............... 423/163, 164, 166, 635, 423/636, 637, 555, 497, 639; 23/300, 304

[56] References Cited

U.S. PATENT DOCUMENTS 3,980,753  9/1976  Grill et al. ............................ 423/163

4,100,254  7/1978  Grohmann et al. .................. 423/163

FOREIGN PATENT DOCUMENTS 2652352  5/1977  Fed. Rep. of Germany .

Primary Examiner—O. R. Vertiz
Assistant Examiner—Wayne A. Langel
Attorney, Agent, or Firm—Sughrue, Rothwell, Mion, Zinn and Macpeak

[57] ABSTRACT

The present invention relates to a process for the recovery of magnesium oxide of high purity in which the magnesium oxide is obtained by thermal decomposition of a magnesium chloride brine previously purified. The magnesium chloride brine itself is obtained by decomposition of impure starting material with hydrochloric acid and purified before the thermal decomposition. In doing so the brine obtained by the decomposition is first concentrated and the separation of the impurities is effected only then. Calcium is separated in form of calcium sulfate. Optionally calcium sulfate and other impurities may be separated together.

12 Claims, 2 Drawing Figures

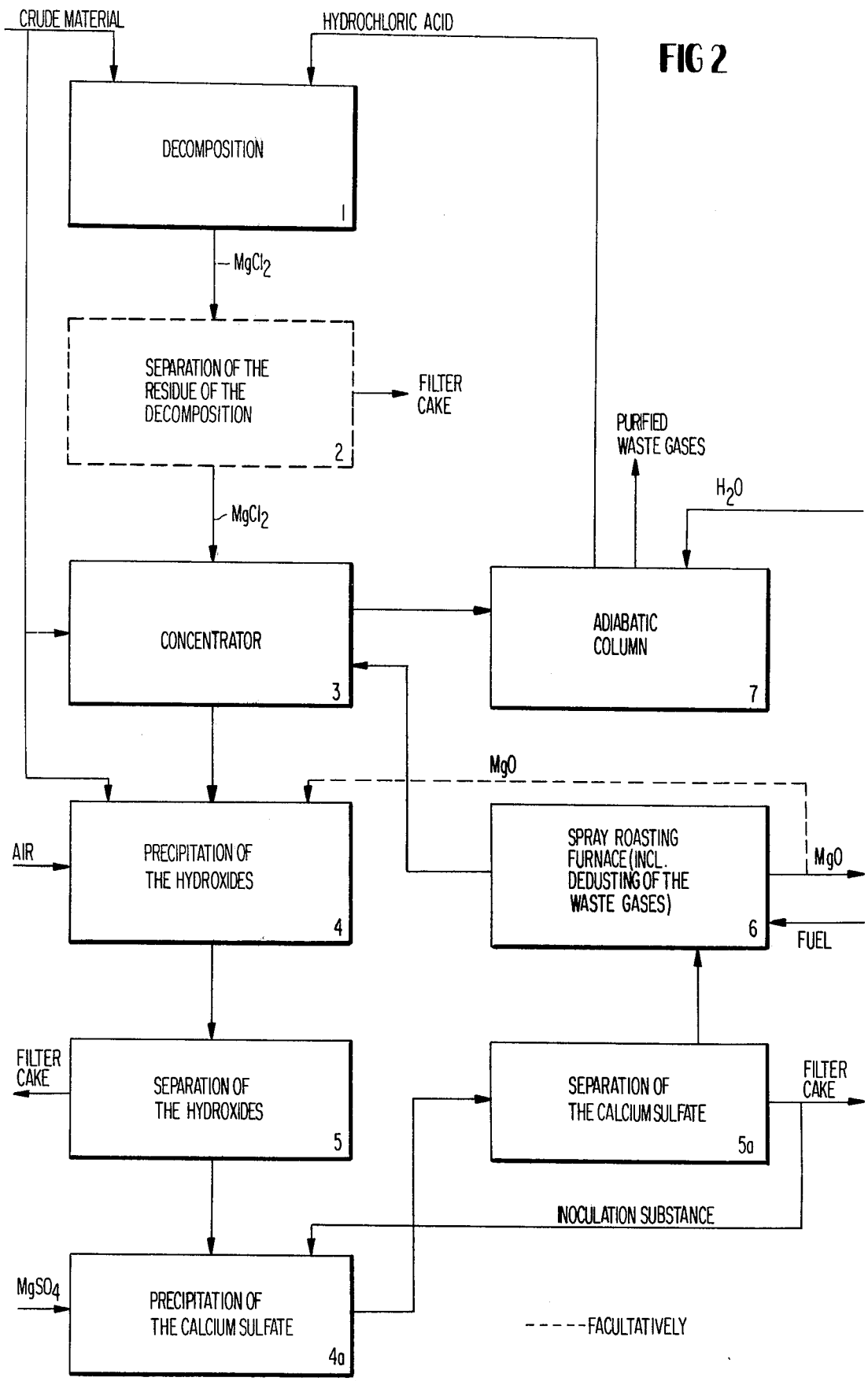

PROCESS FOR THE RECOVERY OF MAGNESIUM OXIDE OF HIGH PURITY

BACKGROUND OF THE INVENTION

1. Field of the Invention

The present invention relates to a process for the recovery of magnesium oxide of high purity from contaminated magnesium containing starting materials or an industrial scale. First the starting substances are dissolved in hydrochloric acid and then pure magnesium oxide is formed from the magnesium chloride brine thus obtained by thermal decomposition after a pretreatment thereof in several steps. During the course of the process a purification and concentration takes place, where the impurities, especially iron compounds, are separated in form of oxide hydrates with simultaneous separation of silicic acid on the one hand and calcium in form of its sulfate being separated from the brine after addition of a material providing sulfate ions to the brine on the other hand. Optionally magnesium and/or calcium containing substances may be added to the brine to shift the pH-value into a range allowing or favoring the separation of the oxide hydrates, and the brine is brought into intimate contact with the waste gases of the decomposition furnace for the purpose of concentration.

2. Description of the Prior Art

In the known processes of this type the magnesium chloride brine or liquor respectively obtained by decomposition of the starting materials with hydrochloric acid is subjected to a first purification process, in which several impurities such as iron and aluminium are precipitated in the form of oxide hydrates and are subsequently separated, with silicic acid being separated too. Then calcium still being present in the magnesium chloride brine is reacted by addition of a material providing the solution with sulfate ions to give calcium sulfate, which is separated subsequently. Thereafter the brine thus purified is brought into intimate contact with the waste gases of the decomposition furnace so as to effect a better heat balance of the process. This contact is effected in a device constructed generally in the form of a wet washer. In addition to combustion gases, the waste gases of the furnace contain hydrogen chloride and water vapor resulting from the decomposition of the magnesium chloride brine. These waste gases frequently also contain some solid material in form of dust which has been delivered from the furnace by the strong smoke gas stream prevailing in the furnace.

The performance of this known process requires a relatively large apparatus and working expenditures, as in each of the two precipitating and separating processes to be carried out subsequently the pH must be adjusted to a value favorable for the precipitation and separation of the impurities. In addition to the substantial expenditure of work and the vessels necessary therefor, a further disadvantage is that the substances added for adjusting the pH-value for the precipitation of calcium remain in the brine and need to be therefore uncontaminated, since otherwise they would impair the desired purity of the magnesium oxide to be obtained. Analogous considerations in particular apply to the necessary adjustment of the pH-value of the magnesium chloride brine purified already after its emergence from the concentrator, before it is subjected to thermal decomposition. Therefore, only pure magnesium oxide, which means only the end product of the process, may be added for increasing the pH-value of the brine, which is acid as a result of taking up hydrogen chloride in the concentrator, so that the economics are impaired.

SUMMARY OF THE INVENTION

Therefore, it is an object of the present invention to provide a process of the type described above in which the mentioned disadvantages are substantially eliminated, in which a rapid and effective separation of impurities may be achieved with use of a reduced apparatus expenditure compared with that of known plants, and which process is highly efficient with respect to the materials to be used and the energy required.

The process of the invention comprises concentrating the magnesium chloride brine or liquor respectively obtained by decomposition of the starting materials with hydrochloric acid and subsequently precipitating and separatng the impurities in the form of oxide hydrates and of calcium sulfate. The above mentioned object is achieved by the procedures of the invention, which allow substantial advantages to be achieved in the course of procedure. Moreover, it is important that, compared with the previous requirements, the process of the invention may be carried out with a substantially reduced expenditure for auxiliary and neutralization means.

BRIEF DESCRIPTION OF THE DRAWINGS

FIGS. 1 and 2 show schematically embodiments of the process of this invention.

DETAILED DESCRIPTION OF THE INVENTION

Figure 1:
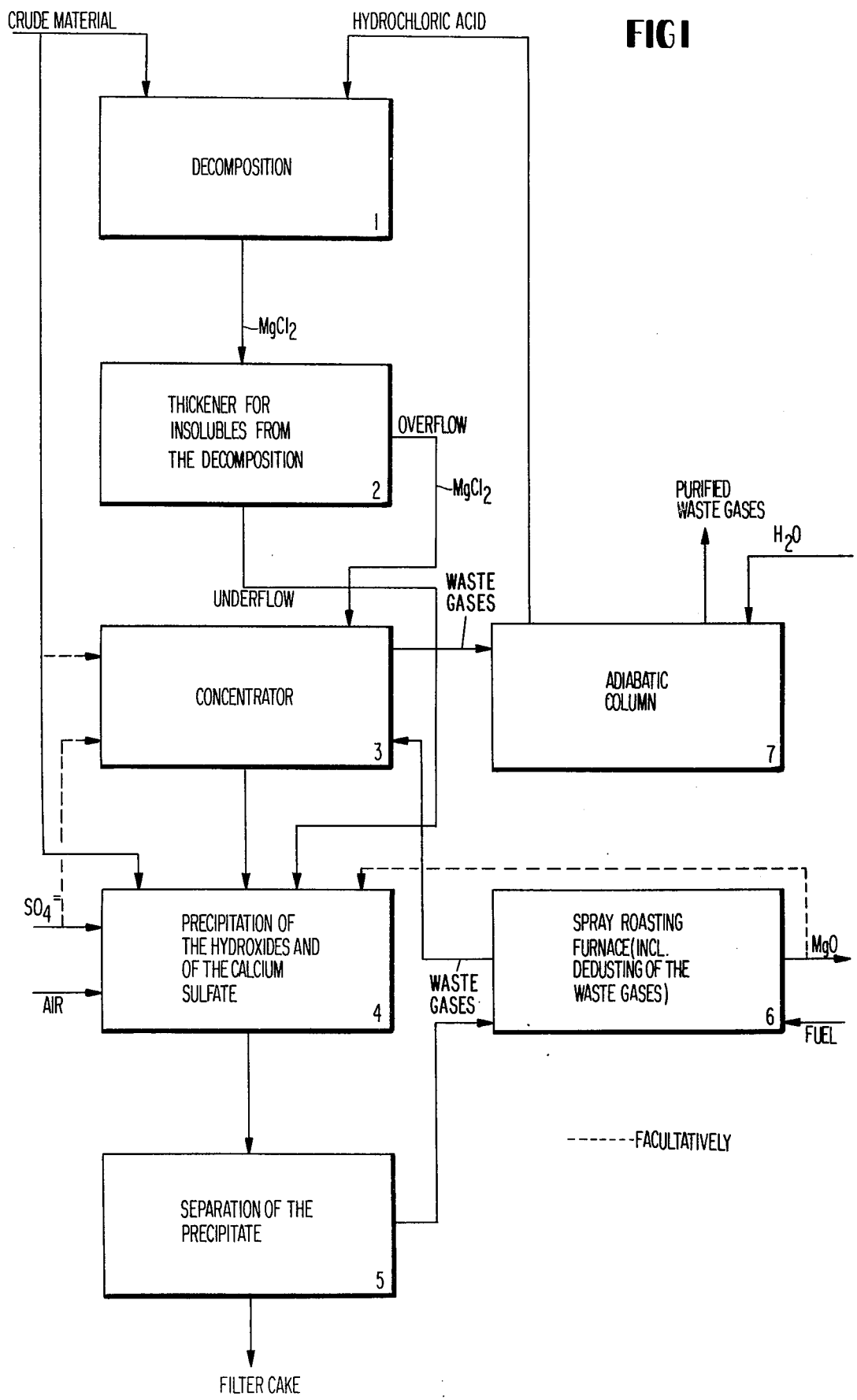

Generally the pH-value of the magnesium chloride brine is modified by an intimate contact thereof with the waste gases of the decomposition furnace. Since according to the process of the invention, the concentration step is followed by entire purification of the brine, the concentrator may be operated primarily by consideration of its own operating requirements without any detrimental consequences. Therefore, a higher take up of hydrogen chloride by the magnesium chloride brine may be allowed, since the increase in the pH-value to be carried out subsequently may be achieved by repeated supply of impure starting material, since impurities contained therein may be separated in the purification operations carried out after the concentration step. If the brine contains a large amount of hydrogen chloride practically no incrustations are formed in the concentrator. The hydrogen chloride taken up by the brine may be utilized for the formation of additional magnesium chloride by adding again magnesium containing starting material to the brine, after the brine has left the concentrator. Optionally the magnesium chloride brine or liquor respectively obtained by the decomposition of the starting materials with hydrochloric acid is subjected to a treatment for thickening the solids thereof (residue to the solution), with the thus obtained brine with a low content of solids being subjected to the concentration step and the solid concentrate obtained thereby being subjected to a further treatment together with the discharge of the concentrator.

However, it is also possible to carry out the concentration step of the magnesium chloride brine by addition of magnesium containing starting material, especially crude magnesite.

If the impurities to be separated from the magnesium chloride brine should be utilized further it is possible according to the process of the invention to precipitate and to separate the impurities in form of the oxide hydrates separately from the calcium sulfate. If only the impurities are to be separated from the magnesium chloride brine a common precipitation and separation of the impurities from the magnesium chloride brine to be purified may be carried out. A common deposit may be obtained. Also, for both kinds of impurities, special favorable precipitating conditions may be established, if first the precipitation of the impurities precipitating in form of oxide hydrates and then after a subsequent addition of the material supplying the sulfate ions the precipitation of the calcium sulfate is carried out. To separate the impurities precipitated in form of oxide hydrates, the solids of the brine or liquor respectively are thickened and, to separate the calcium sulfate also a thickening treatment of the solids of the brine or liquor respectively is carried out. The underflows of the two thickeners in which the solid concentrate is obtained is filtered together and the filtrate is added to the brine to be subjected to the separating step of the calcium. The recycling of the filtrate of the common filtration into the brine still to be subjected to the separation of the calcium is carried out because the portion of the filtrate coming from the underflow of the first mentioned thickener still contains the total calcium content.

A more simple and rapid course of procedure and the possibility of use of also relatively highly impure substances as source of the sulfate ions result if the precipitation of the impurities precipitated in form of oxide hydrates and the precipitation of the calcium sulfate are effected together. In addition to savings in the apparatus this procedure reduces the manipulations necessary for the provision of the separating conditions, because the parameters influencing the separation are to be adjusted only once, so that also only one vessel system is necessary for the separation step whereas e.g. in case of the usual separation of iron and similar impurities on the one hand and of calcium on the other hand at least two vessel systems are necessary, which may be constructed in form of stirred vessel cascades. However, it is of special importance that in case of common precipitation and separation of the impurities present in the magnesium chloride brine the substances to be added to the brine, so as to provide the sulfate ions as well as the substances being added to the brine to adjust to a favorable pH-value for the separation of impurities may be relatively highly contaminated, as the separable impurities of the substances added for the adjustment of the pH-value may be coseparated. Additionally, it should be mentioned that the incorporation of such impurities may influence positively also the separation of other impurities present already in the brine especially the incorporation of iron and aluminium in-to the magnesium chloride brine, as iron and aluminium effect by their separation also the precipitation of silicic acid contained in the magnesium chloride brine. A common precipitation of the impurities to be separated is advantageous in as much as the optimum pH-values for the precipitation of the oxide hydrates on the one hand and for the precipitation of the calcium sulfate on the other hand lie close together.

It is particularly advantageous in the common precipitation and separation of the impurities present in the magnesium chloride brine to add sulphuric acid to the brine to supply the sulfate ions as the addition of sulphuric acid may be done in simple manner and thus the sulfate ions are available rapidly for binding the calcium in form of calcium sulfate in the brine. Further as the increase of the pH-value of the brine to a value favorable for the separation of the oxide hydrates and of the calcium sulfate (generally between 5 and 7) to be carried out subsequently may be achieved with contaminated impurities and therefore also the sulphuric acid itself may be relatively highly contaminated, thus inexpensive waste sulphuric acid may be used. The addition of the sulphuric acid may be previously effected advantageously in the concentrator, as this is favorable from the standpoint of the apparatus and the binding of the sulfate ions to the calcium is assisted.

However, also iron or aluminum sulfate may be used to supply the sulfate ions, as these substances are available at a relatively low price. This is advantageous with respect to the adjustment of the pH-value of the brine to a value favorable for the separation of impurities compared with the use of sulphuric acid. Furthermore such a procedure is advantageous in the processing of crude magnesites with a low content of iron and aluminum since as the silicic acid present in the crude material may be separated together with the other impurities more simply.

Also, if magnesium sulfate (kieserite) is used in the common separation of the impurities present in the brine to supply the sulfate ions the advantage that a contaminated carrier of sulfate ions may be used; results. Additionally, the bonus of an improved yield of magnesium oxide is achieved.

The present invention is illustrated now with respect to examples of the process of the invention which are shown in the form of diagrams in the drawing. FIG. 1 shows in schematic form the course of the process with common precipitation and separation of the impurities contained in the magnesium chloride brine, whereas FIG. 2 also shows in schematic form the precipitation with subsequent separation of the hydroxides and of the calcium sulfate.

In the procedure shown schematically in FIG. 1 magnesium containing starting materials are dissolved in hydrochloric acid in step (1) of the process. In step (2) thereof the undissolved residues of the crude material are separated from the magnesium chloride brine obtained in step (1). This step is effected advantageously by sedimentation in a thickening device. However, also a device operating on the principle of a centrifuge or a filter may be used for this solid-liquid-separation. The overflow of the thickening device being a magnesium chloride brine substantially free of solid substances is concentrated in step (3) of the process. In this step the magnesium chloride brine is brought into intimate contact with hot gases, which evaporate a portion of the water of the brine and increase thereby the brine and the concentration of HCl.

After the concentration of the brine in step (4) of the process the impurities dissolved in the brine are precipitated. To provide suitable conditions for the precipitation, first of all the pH-value of the brine must be adjusted to a value favoring the precipitation. Air or chlorine gas or other oxidants are introduced into the brine so as to effect the oxidation of certain impurities. Iron and manganese obtain an especially favorable valency for the precipitation.

For precipitating the calcium sulfate also a substance providing sulfate ions is added to the brine. Such substances are e.g. sulphuric acid ($H_2SO_4$), magnesium sulfates ($MgSO_4$), iron sulfates ($FeSO_4$) or aluminum sulfate ($Al_2(SO_4)_3$). However, the source of sulfates may be also the waste products of other industries which had to be removed up to now with an expenditure of costs. Thus, if sulphuric acid is added the use of corrosive liquids deriving from pickling plants working with sulphuric acid or of "thin acid" resulting from the $TiO_2$-industry is possible. The source of iron sulfate may be the so called "green salt" of the $TiO_2$-industry. If sulphuric acid should be added so as to provide sulfate ions, the acid may be added to the magnesium chloride brine already in the concentrator.

The separation of the impurities precipitated from the magnesium chloride brine in step (4) of the process is effected in step (5) of the process in a similar manner as in step (3) in a thickening device. The filter cake obtained in the solid-liquid-separation in step (5) of the process may be brought to a deposit. The purified magnesium chloride brine obtained in step (5) of the process is subjected in step (6) of the process to a thermal decomposition which may be carried out e.g. in a spray roasting furnace. There magnesium oxide, on the one hand, and waste gases, on the other hand, are obtained which contain hydrogen chloride and water vapor in addition to the oxidation products of the fuel from the decomposition of the magnesium chloride brine. These waste gases may carry away also solids which are swept away by the intensive flow of gases in the furnace.

The waste gases of step (6) of the process are transferred to the concentrator of process step (3) and give off there a substantial portion of their heat content to the magnesium chloride brine. Simultaneously, also a portion of the hydrogen chloride obtained in the waste gases of process step (6) is taken up by the magnesium chloride brine, whereby the pH-value thereof is decreased. This uptake of hydrogen chloride may be utilized for an additional increase of the concentration of the magnesium chloride brine by adding further magnesium containing material to the brine. This may be effected e.g. by introducing additional magnesium containing crude material, e.g. crude magnesite, into the concentrator or by additionally adding crude material to the magnesium chloride brine coming from the concentrator.

The addition of such substances binding the hydrogen chloride also increases the pH-value of the brine so that then only a fine adjustment of the pH-value of the brine is carried out so as to adjust the optimum of conditions for precipitating the impurities. This fine adjustment may be accomplished e.g. with purified magnesium oxide, as it is prepared in the process of the invention, since the fine adjustment requires only relatively small amounts of substances. Thus the production balance of the process is not burdened noticeably by the amounts of magnesium oxide with-drawn from the starting side. However, also contaminated magnesium oxide may be used for the fine adjustment of the pH-value of the brine, as a separation of impurities from the brine is still to be effected.

The waste gases of process step (6) are dedusted in the concentrator of process step (3) and conducted to an adiabatic adsorption column after leaving the concentrator of step (3), in which column the last step (7) of the process of the invention is effected. In this step the absorption of the hydrogen chloride contained in the waste gases in water is effected, the resulting hydrochloric acid being recycled in-to step (1) of the process.

For obtaining an optimum of production balance the waste gases of process step (6) frequently carrying along a greater amount of magnesium oxide practically free of impurities are dedusted.

In the procedure shown in FIG. 2, similar to the procedure shown in FIG. 1, the magnesium containing crude material is decomposed with hydrochloric acid in step (1), and the magnesium chloride liquor obtained may be subjected subsequently in step (2) of the process to a solid-liquid-separation for separating the undissolved components of the liquor. The magnesium chloride brine thus obtained, and optionally purified in step (2) by removing solids, is transferred to a concentrator (process step (3), in which the concentration of the magnesium chloride brine is increased by an intimate contact with waste gases of a decomposition furnace in analogy to the procedure of FIG. 1. The liquor obtained in process step (1) or the brine obtained in process step (2) may be sprayed simply in-to a concentrator constructed in form of a washing tower. The uptake of hydrogen chloride from the waste gases of the decomposition furnace which occurred in the concentrator and the decrease of the pH-value of the brine caused thereby respectively must be increased so as to provide suitable conditions for the precipitation of the impurities. This increase is effected by addition of magnesium containing crude material (which addition may be carried out also previously in the concentrator), by washing out dust particles of the waste gases of the decomposition furnace as well as by the optional addition of magnesium oxide. For oxidizing several impurities present in the brine, additionally air and/or chlorine gas is blown into the brine. Thereby conditions favorable for the precipitation of impurities in the form of hydroxides are provided in the brine, so that these impurities precipitate and carry away also other impurities, e.g. silicic acid. After the precipitation of the impurities of step (4) of the process said impurities are separated from the brine in the solid-liquid-separation of step (5). Then a substance providing sulfate ions, e.g. magnesium sulfate, is added to the brine (process step 4a) so as to precipitate the calcium still present in the brine in the form of calcium sulfate. To facilitate the separation of the calcium sulfate (process step 5a) it is advantageous to add also a certain amount of an inoculation substance favoring the formation of crystals. An example of an inoculation substance is calcium sulfate; the calcium sulfate obtained in the present process is especially suitable.

The brine thus purified in two subsequent precipitation and separation procedures is transferred in a manner similar to the procedure of FIG. 1 to a spray roasting furnace, in which step (6) of the process is effected, namely the thermal decomposition of the magnesium chloride brine. The waste gases of the spray roasting furnace are fed to the concentrator of step (3). Then the content of hydrogen chloride is worked up in an adiabatic adsorption column in step (7) of the process to give hydrochloric acid, which is recycled to step (1) of the process.

What is claimed is:

1. A process for the production of magnesium oxide of high purity from contaminated magnesium-containing starting materials on an industrial scale, comprising
   (1) dissolving a magnesium-containing starting material in hydrochloric acid to produce a magnesium chloride brine;
   (2) removing undissolved residue from the magnesium chloride brine produced in step (1);
   (3) concentratng the magnesium chloride brine obtained from step (2);

(4) precipitating the remaining impurities from the magnesium chloride brine of step (3) by adjusting the pH of the magnesium chloride brine to a pH range favoring such precipitation, by contacting said magnesium chloride brine with an oxidizing agent and by adding a source of sulfate ion to the magnesium chloride brine;

(5) removing precipitated impurities from the magnesium chloride brine produced in step (4); and (6) thermally decomposing the magnesium chloride brine of step (5) to produce magnesium oxide.

2. The process of claim 1, wherein after the addition of the source of sulfate ion in the precipitating of step (4), the process includes precipitating the impurities present in the form of oxide hydrates and calcium sulfate by adjustment of the pH-value of the magnesium chloride brine to a value favoring the precipitation of the impurities.

3. The process of claim 2, wherein sulfuric acid is the source of sulfate ion.

4. The process of claim 3, wherein sulfuric acid is added as a source of sulfate ion prior to the concentrating in step (3).

5. The process of claim 2, wherein aluminum sulfate is the source of sulfate ion.

6. The process of claim 2, wherein kieserite is the source of sulfate ion.

7. The process of claim 2 wherein, after concentrating the magnesium chloride brine in step (3), step (4) is carried out by first precipitating the oxide hydrates and subsequently precipitating the remaining calcium in the form of the sulfate thereof.

8. The process of claim 2, wherein iron sulfate is the source of sulfate ion.

9. The process of claim 1, wherein the concentrating of the magnesium chloride brine in step (3) is by addition of magnesium-containing starting material.

10. The process of claim 9, wherein said magnesium-containing starting material is magnesite.

11. The process of claim 1, wherein, prior to concentrating the magnesium chloride brine in step (3), the process includes subjecting the magnesium chloride brine to a solids thickening treatment.

12. The process of claim 1 wherein the concentrating in step (3) is conducted by contacting the magnesium chlorine brine obtained from step (2) with waste gases from a decomposition furnace used to conduct step (6).

* * * * *